(12) United States Patent
Goldberg

(10) Patent No.: US 8,050,640 B2
(45) Date of Patent: Nov. 1, 2011

(54) DIVERSE ANTENNA SYSTEM

(75) Inventor: Bar-Giora Goldberg, San Diego, CA (US)

(73) Assignee: Avaak, Inc., San Diego, CA (US)

( * ) Notice: Subject to any disclaimer, the term of this patent is extended or adjusted under 35 U.S.C. 154(b) by 0 days.

(21) Appl. No.: 10/966,281

(22) Filed: Oct. 15, 2004

(65) Prior Publication Data

US 2005/0136856 A1    Jun. 23, 2005

Related U.S. Application Data

(60) Provisional application No. 60/512,450, filed on Oct. 20, 2003.

(51) Int. Cl.
*H04B 17/02* (2006.01)

(52) U.S. Cl. .............. 455/139; 455/276.1; 455/304

(58) Field of Classification Search .......... 455/132–141, 455/272–279.1, 232.1–253.2, 303–306, 142; 375/346, 229, 316, 350, 147, 148, 232, 233, 375/345, 318, 319, 320, 347, 349
See application file for complete search history.

(56) References Cited

U.S. PATENT DOCUMENTS

| | | | | |
|---|---|---|---|---|
| 3,593,147 | A * | 7/1971 | Gurak et al. | 455/139 |
| 3,641,437 | A * | 2/1972 | Gurak et al. | 455/138 |
| 4,752,941 | A * | 6/1988 | Takahara et al. | 375/347 |
| 5,263,180 | A * | 11/1993 | Hirayama et al. | 455/139 |
| 5,465,271 | A * | 11/1995 | Hladik et al. | 375/267 |
| 5,697,083 | A * | 12/1997 | Sano | 455/276.1 |
| 5,757,858 | A * | 5/1998 | Black et al. | 375/295 |
| 6,571,090 | B1 * | 5/2003 | Moriyama et al. | 455/277.1 |
| 2003/0026365 | A1 * | 2/2003 | Ho et al. | 375/347 |
| 2003/0186660 | A1 * | 10/2003 | Lee | 455/140 |
| 2003/0189917 | A1 * | 10/2003 | Sudo | 370/347 |
| 2005/0078649 | A1 * | 4/2005 | Tehrani et al. | 370/343 |

* cited by examiner

*Primary Examiner* — Edward Urban
*Assistant Examiner* — Rui Hu
(74) *Attorney, Agent, or Firm* — Manuel F. de la Cerra

(57) ABSTRACT

An improved antenna diversity system is provided. The antenna diversity system has at least two spaced-apart antennas, with each antenna providing a respective antenna signal. The signal(s) may be processed and scaled according to its respective power level. The phase difference is determined between the signals, and the phase difference reduced by using phase rotation. The signals, which are now substantially in-phase, are summed to generate a combined antenna signal.

23 Claims, 6 Drawing Sheets

DIVERSE ANTENNA SYSTEM

RELATED APPLICATIONS

This application claims priority to U.S. provisional application No. 60/512,450, filed Oct. 20, 2003, and entitled "A Simplified and Fundamentally Efficient Antenna Combiner Technique", which is incorporated by reference as if set forth in its entirety.

FIELD OF THE INVENTION

The present invention relates generally to wireless communication devices, and more specifically to a diverse antenna structure and process suitable for use in such devices.

DESCRIPTION OF RELATED ART

Wireless communication equipment, such as cellular and other wireless telephones, wireless network (WiLAN) components, GPS receivers, mobile radios, pagers, and other wireless devices are enjoying increasing popularity in the contemporary consumer marketplace. One reason for their increasing popularity is the large number of applications that such devices are now capable of supporting, and the wide availability of wireless services. Wireless devices also continue to expand their usage in commercial and military applications, for example, in aviation applications, for similar reasons. As the acceptance and use of the wireless devices grows, consumers and commercial users are demanding applications requiring higher data rates, and less interruption to their wireless connectivity.

In obtaining these higher data rates and improved connectivity, a critical assembly for the wireless devices is its antenna system. Generally, the antenna system provides a transition between a signal in a guided wave within the wireless device and a free space wave. It is the antenna and its associated circuitry that is used to both transmit and receive information signals, which allows the wireless device the ability to communicate across a wide range. Antenna technology continues to advance rapidly and such advances are instrumental in enabling higher performance and smaller packaging in wireless devices. For example, enhancements in antenna technology can yield increased performance in terms of higher signal strength, improved reception of weaker signals, longer battery life, increased (or narrowed, if desired) bandwidth and smaller packaging.

Most terrestrial (and flight) radio channels suffer from multipath and fading effects. For example, the communication signal may bounce-off objects, such as buildings or walls, so that multiple time-delayed versions of the signal are received at the antenna, thereby generating a composite signal in the receiving antenna. Since the direct and reflected signals can be modeled as a series of vectors, they can add or cancel in the composite signal, resulting in fades, ghosts, or corrupted information. The electromagnetic waves emitted by the transmitter usually take different paths in getting to the receiver, depending upon the obstacles in the environment (ground, trees, building, vehicles, etc . . . ). As a result, the received signal is actually a sum of the various contributing signals, each of which differs in amplitude, delay and phase. In many cases, the signals combine in a destructive manner, thereby severely degrading the signal's strength at the receiver. The receiver is faced with the difficult task of properly demodulating and decoding the signal, which is dynamically fading in and out. For example, a vehicle moving at about 55 mph can suffer up to 100 fades per second.

The multipath effect is a well-known phenomenon that may be addressed by using high gain and pointed or directed antennas. Such an antenna arrangement may use a directed antenna or set of antennas to concentrate reception in one direction, and reject bounced signals coming from a different direction. Although this improves the quality of signal reception, the majority of radio applications can not use pointed antennas, due to size and cost limitations and the inability of the user to know the direction of the incoming signal. Further, in many mobile applications, the wireless device is moving, so the antenna would continuously have to be adjusted to point to the signal source.

To combat the effects of signal fade, a modulation technique may be selected that better addresses the multipath degradation. For example, CDMA is generally considered to withstand multipath better than narrow band channels modulation systems. However, even CDMA still suffers from multipath and fading issues, and many of the existing wireless systems use other modulation systems, such as TDMA. In addition to modulation, other antenna solutions are being sought to combat the effects of signal fading. One general approach is to use more than one receive antenna to create spatial diversity, and then combine the signals received by the various receiving elements. In this way, one or more antenna may be suffering from a fade, but another antenna in the array may be receiving a stronger signal. By combining the signals, a more robust combined signal may be generated. Several approaches have been developed to address how to combine these signals. The solutions to this problem range from the very simple: just a switch that moves from antenna to antenna if the existing power is below a certain level; to complex adaptive arrays, based on optimum convergence algorithms. One very complex, but effective solution, is generally referred to as the Maximum Ratio Combining method.

While a simple antenna combiner uses a single radio, it is limited to using a single antenna at one time (the DSP will switch from antenna A to B when there isn't sufficient power from signal A), a Maximum Ratio Combiner (MRC) is an adaptive optimum device which uses all antenna elements simultaneously. Each antenna provides an RF signal, and the MRC rotates the phase of the RF signals so they may be added coherently (in phase) and adds weights to them according to their relative strength (weighted average). Hence, the stronger signals (one or more) become dominant in the system and the weaker signals are attenuated such that an optimal SNR is achieved. The whole process is adaptive, and the complete antenna array can be viewed as a "single" antenna that can change its direction dynamically and can adapt quickly and efficiently to the varying attributes of the incoming signals. However, the antenna array is cumbersome, complicated, costly, and often hard to implement. For example, the incoming signal (often in IF) may have to be mixed, filtered then mixed and filtered again before being added (combined).

In the MRC case, one can show that the optimum signal to noise ratio is achieved by rotating the incoming signals to the same phase so they can be added coherently, and then scaling them by multiplying each signal by its relative power. A block diagram of the MRC process is shown in FIG. 7. Given array signals with relatively slow varying phase shift due to multipath:

$S_i = a_i e^{j(wt + \phi(t) + \phi_i(t))}$, where w is the carrier, $\phi(t)$ is the information (FM or PM), $\phi_i(t)$ is a slowly varying phase due to circuitry or motion, and $a_i$ is channel amplitude, then the optimum output from the array after processing is given by:

$$Sr^* = \Sigma a_i^2 e^{j(wt + \phi(t))}.$$

The resultant solution can be shown to be an optimum Signal to Noise Ratio solution under certain conditions. In the case where all branches have equal power, the antenna SNR will improve by N, where N is the number of antenna elements. For example, suppose two antennas are receiving the same signal level, thus having the same SNR, if both signals can be added coherently, then their voltages add coherently but the noise adds incoherently resulting in a 2:1 or 3 dB gain.

Overall, if there are N antenna elements and the general output of the array is $\Sigma a_i e^{j(wt+\phi(t)+)+\phi_i(t))} \cdot Wi$ (Wi are complex numbers) and we look for the Wi solution that maximize SNR, then optimum signal to noise ratio is achieved as indicated above by:

$Wk = a_k e^{j(\phi(t)-\phi_k(t))}$ ($\phi k$ can be an arbitrary phase or the phase of the stronger signal; this operation is actually rotating all to same phase).

In operation, not all elements must rotate to the strongest channel, as long as they all rotate to the same reference phase. MRC is generally not used to achieve antenna gain effects, but rather to improve coverage, since fading effects degrade reception of some of the elements. It would be desirable to provide a diversity antenna system which produced an optimum signal to noise ration as with the MRC process, but that does not require its cumbersome and complex processing.

SUMMARY

Briefly, the present invention provides an improved antenna diversity system. The antenna diversity system has at least two spaced-apart antennas, with each antenna providing a respective antenna signal. The signal(s) may be processed and scaled according to its respective power level. The phase difference is determined between the signals, and the phase difference reduced by using phase rotation. The signals, when substantially in-phase, are summed to generate a combined antenna signal.

In one example, the antenna diversity system has two antennas, with each antenna providing an antenna signal. Each antenna signal is processed into a respective channel, and the power of each channel is determined. Each channel signal is scaled by the square of its measured power, and the phase difference between the channels is determined. The stronger channel is set as the reference channel, and the weaker channel is rotated until it is emitted substantially in-phase with the reference channel. The aligned channels are summed, and the resulting combination signal forwarded for further processing and demodulation.

These and other features will become apparent by review of the figures and detail descriptions that follow.

BRIEF DESCRIPTION OF THE DRAWINGS

The present invention is described herein with reference to the following drawings. The drawings are provided for purposes of illustration only and not limitation. It should be noted that for clarity and ease of illustration these drawings are not made to scale.

DETAILED DESCRIPTION

Figure 1:
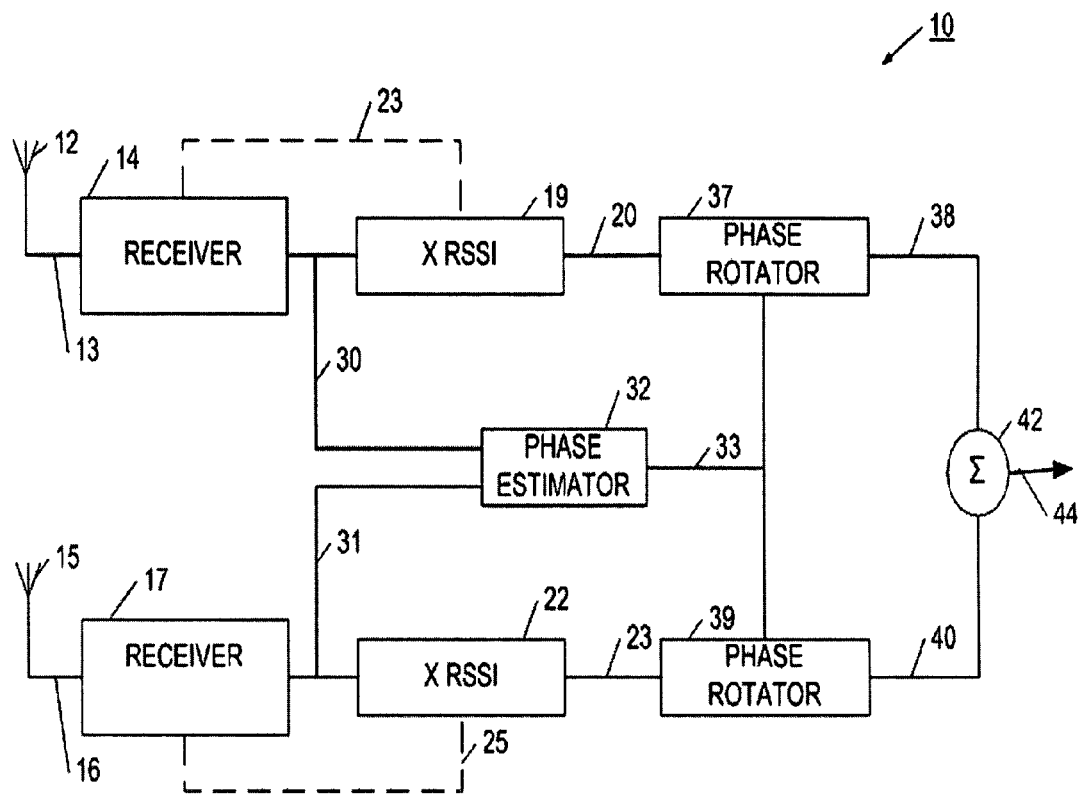
FIG. 1 is a block diagram of a diverse antenna system in accordance with the present invention.

Referring now to FIG. 1, an antenna diversity system is shown. In one use, the antenna system may be incorporated into the receive section of a wireless device. For example, the antenna system may be used in a mobile handset, in mobile computing devices, in a basestation, in aviation communication devices, in military radios, or in other wireless applications or devices. The antenna system uses multiple antenna elements to receive electromagnetic waves. Although the antenna system may use several antennas, FIG. 1 illustrates the antenna system 10 with two antennas 12 and 15. Antenna 12 and antenna 15 each receive a communication signal in the target communication band, and are positioned in a spaced-apart arrangement. In one example, the antennas 12 and 15 may be spaced apart about two inches on a mobile device configured to receive an RF communication signal. It will be understood that the spacing between the antenna elements will depend on application specific requirements, such as the frequency or wavelength of the received signal, size of the device, required gain, or other factors.

Antenna 12 provides an RF signal 13 to receiver 14 and antenna 15 provides another RF signal 16 to receiver 17. The receivers 14 and 17 provide filtering, amplification, and mix-down functions. The signal generated by each respective receiver may be an RF (radio frequency), and IF (intermediate frequency), or baseband signal, depending on the communication standard and the specific receiver structure used. In one example, the receivers 14 and 17 each generate an IF signal, which is converted to a baseband signal in another section (not shown) of the wireless device. To assist in understanding the antenna system 10, the details for the receivers 14 and 17 are not shown, as it will be appreciated that receiver design is well known and need not be addressed in detail.

The signal 30 from receiver 14 is received into the signal strength block 19. Signal strength block 19 has two general functions: 1) to determine the power level of signal 30, and 2) to multiply the signal 30 by that determined power level. The power level may be directly measured in block 19 using known power measurement circuits, or may be calculated or estimated. In one example, the power level is calculated using the complex signal characteristics of signal 30. When signal 30 is provided as a complex I/Q channel, power may be estimated by the equation: Estimated Power (voltage)=$\sqrt{(I^2 + Q^2)}$. In another example, the receiver 14 has an amplification circuit which provides an RSSI (power level) output 23. The output 23 may be received into the signal strength block 19, where it is used to scale the signal 30. It will be understood that other methods or circuits may be used to determine a power level for signal 30. The signal 20 is therefore scaled according to the power level of signal 30.

The signal 31 from receiver 17 is received into the signal strength block 22. Signal strength block 22 has two general functions: 1) to determine the power level of signal 31, and 2) to multiply the signal 31 by that determined power level. The power level may be directly measured in block 22 using known power measurement circuits, or may be calculated or estimated. In one example, the power level is calculated using the complex signal characteristics of signal 31. When signal 31 is provided as a complex I/Q channel, power may be estimated by the equation: Estimated Power (voltage)=$\sqrt{(I^2 + Q^2)}$. In another example, the receiver 17 has an amplification circuit, which provides an RSSI (power level) output 25. The output 25 may be received into the signal strength block 22, where it is used to scale the signal 31. It will be understood that other methods or circuits may be used to determine a power level for signal 31. The signal 23 is therefore scaled according to the power level of signal 31.

Signal 30 and signal 31 are also received into phase estimator 32. Phase estimator 32 determines a phase difference between signal 30 and 31, and communicates 33 the phase difference to phase rotator 37 and phase rotator 39. In one example, the phase estimator 32 uses the stronger of signal 30 and signal 31 as a reference signal, and therefore rotates only the weaker signal. As a more specific example, if signal 30 is the stronger signal, then the phase estimator 32 measures the difference between signal 30 and 31, and instructs phase rotator 39 to rotate signal 23 according to the phase difference. In another example, both signal 20 and signal 23 are rotated according to a common reference phase. Signal 38 and signal 39 are therefore provided substantially in-phase, and may be coherently combined in combiner 42. The combined signal 44 is then communicated to other circuitry for further processing or demodulation.

It will be understood that the antenna system 10 may be implemented using a combination of hardware, software, firmware, and discrete components. The antenna system 10 provides a simplified architecture for antenna combining systems in radio applications. The antenna system 10 provides a combined signal 44 that has a signal to noise ratio that is similar to the optimum signal to noise ratio that could be obtained by the known MRC processing. But, the antenna system 10 uses a simpler, modified open loop method, and with significantly fewer hardware components, which translates into power and cost savings.

Generally, as compared to the MRC process, the antenna system 10 eliminates the post processing (double filtering and mixing) of the MRC, and replaces it with some relatively simple RF and/or DSP processing to obtain nearly the same results of the MRC but with substantially less hardware components. As generally described above, the antenna system 10 multiplies each RF channel by its relative power to generate an $a_i^2$ term. This can be achieved by using the RSSI (signal strength) available in some RF or IF amplifiers, or calculated from the complex communication signal. If the signal is down converted to IF or baseband, then this function may be performed easily through the use of DSP. The antenna system 10 measures the phase between the channels and rotates the channels to a substantially in-phase relationship. Since all branches carry similar information and are typically only delayed slightly, this function can be done in DSP by either mixing the 2 IFs or directly in DSP by comparing the phase of the various channels.

Figure 2:
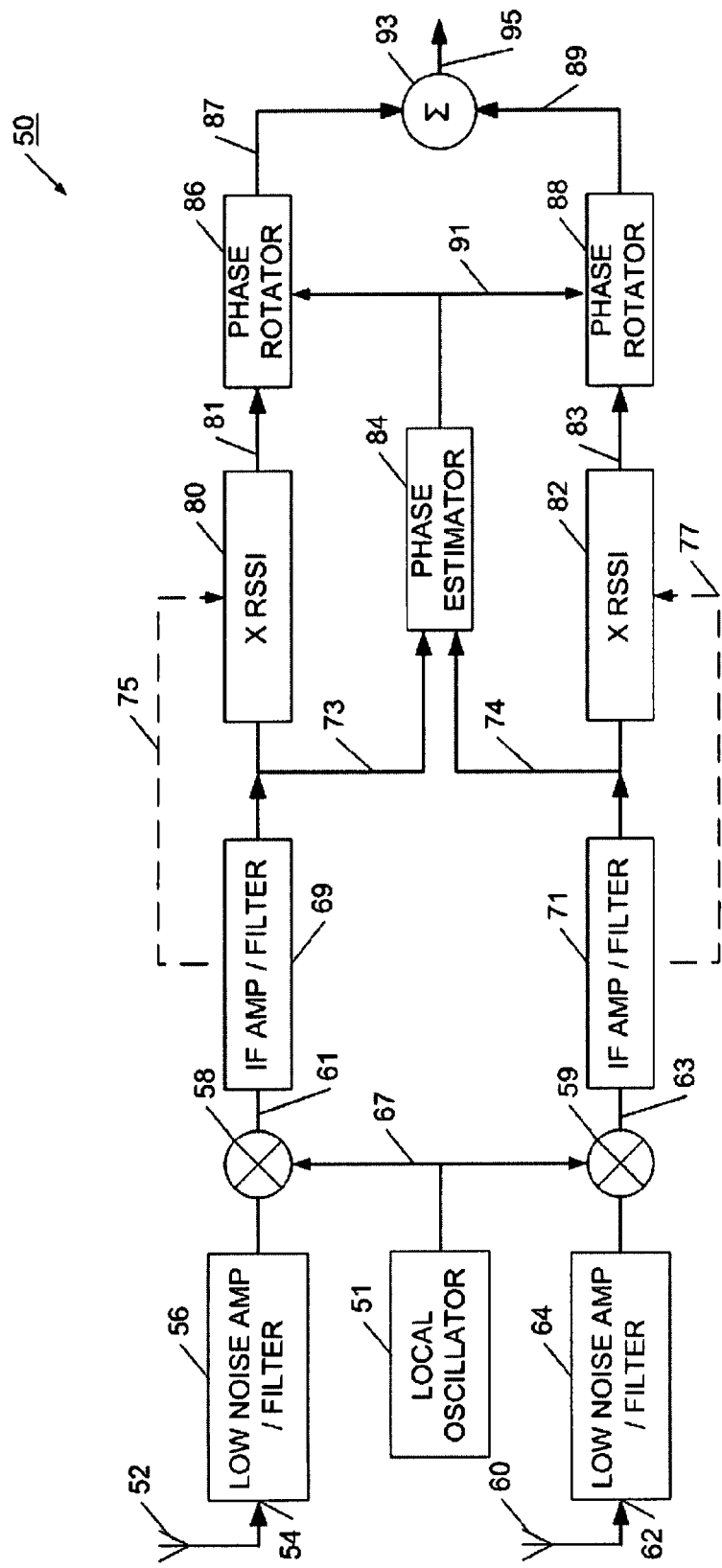
FIG. 2 is a block diagram of a diverse antenna system in accordance with the present invention.

Referring now to FIG. 2, a diverse antenna system 50 is shown. Although the antenna system may use several antennas, FIG. 2 illustrates the antenna system 50 with two antennas 52 and 60. Antenna 52 and antenna 60 are constructed to receive the communication signal in the target communication band, and are positioned in a spaced-apart arrangement. In one example, the antennas 52 and 60 may be spaced-apart about two inches on a mobile device configured to receive an RF communication signal. It will be understood that the spacing between the antenna elements will depend on application specific requirements, such as the frequency of the received signal, size of the device, required gain, or other factors.

Antenna 52 provides an RF signal 54 to low-noise amplifier and filter section 56 and antenna 60 provides another RF signal 62 to low-noise amplifier and filter section 64. A local oscillator 51 provides a signal 67 to mixer 58 and mixer 59, which then each to generate a respective intermediate frequency signal. Intermediate frequency signal 61 is received into an IF amplifier and filter section 69, while intermediate frequency signal 63 is received into an IF amplifier and filter section 71. To assist in understanding the antenna system 50, the details for the receiver are not shown, as it will be appreciated that receiver design is well known and need not be addressed in detail.

The signal 73 from amp/filter section 69 is received into the signal strength block 80. Signal strength block 80 has two general functions: 1) to determine the power level of signal 73, and 2) to multiply the signal 73 by that determined power level. The power level may be directly measured in block 80 using known power measurement circuits, or may be calculated or estimated. For example, the amp/filter section 69 has an amplification circuit, which provides an RSSI (power level) output 75. The output 75 may be received into the signal strength block 80, where it is used to scale the signal 73. It will be understood that other methods or circuits may be used to determine a power level for signal 73. The signal 81 is therefore scaled according to the power level of signal 73, and more particularly, it is scaled to the square of the power level. It will also be appreciated that the scaling factor may be set in alternative ways, for example, by setting the scaling factor according to a Fourier or other transform result.

The signal 74 from amp/filter section 71 is received into the signal strength block 82. Signal strength block 82 has two general functions: 1) to determine the power level of signal 74, and 2) to multiply the signal 74 by that determined power level. The power level may be directly measured in block 82 using known power measurement circuits, or may be calculated or estimated. In one example, the power level is calculated using the complex signal characteristics of signal 74. For example, the amp/filter section 71 has an amplification circuit which provides an RSSI (power level) output 77. The output 77 may be received into the signal strength block 82, where it is used to scale the signal 74. It will be understood that other methods or circuits may be used to determine a power level for signal 74. The signal 83 is therefore scaled according to the power level of signal 74, and more particularly, it is scaled to the square of the power level. It will also be appreciated that the scaling factor may be set in alternative ways, for example, by setting the scaling factor according to a Fourier or other transform result.

Signal 73 and signal 74 are also received into phase estimator 84. Phase estimator 84 determines a phase difference between signal 73 and 74, and communicates 91 the phase difference to phase rotator 86 and phase rotator 88. In one example, the phase estimator 84 uses the stronger of signal 73 and signal 74 as a reference signal, and therefore rotates only the weaker signal. As a more specific example, if signal 73 is the stronger signal, then the phase estimator 84 measures the difference between signal 73 and 74, and instructs phase rotator 88 to rotate signal 83 according to the phase difference. In another example, both signal 81 and signal 83 are rotated according to a common reference phase. Signal 87 and signal 89 are therefore provided substantially in-phase, and may be coherently combined in combiner 93. In another example, if one of the signals 61 and 63 is much stronger than the other signal, for example, 10 db stronger, then the weaker signal may be ignored, and the stronger signal may be used alone. It will also be understood that a signal may be ignored responsive to a comparison with an absolute or relative threshold setting. If more than two antennas are used, then the antenna system may be set to ignore received signals that fall below a particular threshold, as measured by its RSSI. It will be understood that the threshold may be a set value, or may be determined relative to other received signals. The combined signal 95 is then communicated to other circuitry for further processing or demodulation.

Figure 3:
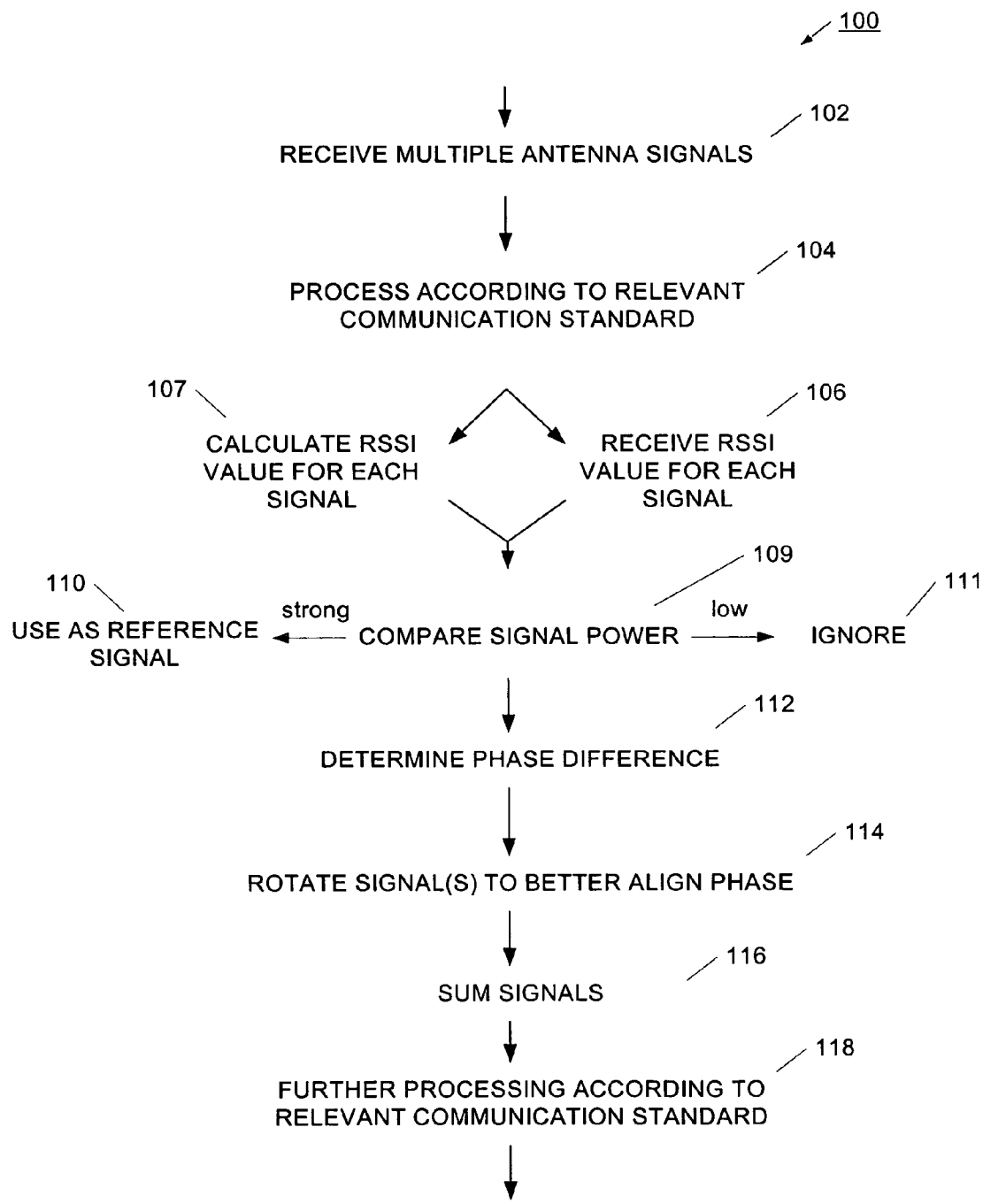
FIG. 3 is a flowchart of a signal combining process in accordance with the present invention.

Referring now to FIG. 3, a method 100 of combining antenna signals is shown. Two or more antennas each provide antenna signals, which are each received into the method 100 as shown in block 102. Due to multipath, fading, or other effects, the received antenna signals may have different power, quality, and phase positions. Each antenna signal is processed according to the relevant communication standard as shown in block 104. For example, each antenna signal may be filtered, amplified, and mixed to generate a respective IF channel. In another example, the antenna signals may be processed directly to baseband or a low-IF frequency. It will be appreciated that the processing of block 104 may be adjusted according to the communication standard implemented by the receiver.

A scaling factor is determined for at least one of the channels. The scaling factor may be a power level, and may be determined for each channel. As shown in block 107, the power level may be calculated using data in each channel. For example, the channel may have complex I and Q data, which may be used to calculate an estimated power factor. Alternatively, as shown in block 106, the power level may be received from an amplifier circuit in the form of an RSSI factor. In optional block 109, the power level of the channels is compared, and a weak signal may be ignored, as shown in block 111. For example, if the weak signal is at least 10 db weaker then the stronger signal, then the weak signal may be ignored. It will be appreciated that other absolute or relative thresholds may be used to determine when to ignore a weak signal. The strongest signal may be used as a reference signal, as shown in 110.

In block 112, a phase difference is determined between channels. The phase difference may be determined relative to the reference channel, if set, or against a standard reference. For more than two channels, the difference may be determined using one of the signals, for example the strongest, as a reference. It will be appreciated that a particular channel may also be set as the reference channel. In block 114, the channels are aligned to be substantially coherent, or in-phase. In making the channels coherent, it will be appreciated that the rotation process used will be independent of how the phase measurements and comparisons were made. For example, if the strongest signal is set as a reference, then the phase of each of the weaker signals will be rotated to better align with the reference signal, and the reference signal will not be rotated. Alternatively, all the channels could be rotated to align with a different reference phase. Also, if all the weaker signals are so weak they are ignored (see block 111), then a 0 degree rotation of the strong signal results in a coherent signal.

Once the channels are rotated to be nearly coherent, then the channels are summed into a combined signal as shown in block 116. The combined signal is then further processed according to the relevant communication standard and receiver implementation, as shown in block 118. The combined signal generated according to method 100 is substantially similar to the optimum signal to noise ratio that is achievable using the much more complex maximum ratio combining (MRC) process.

Figure 6:
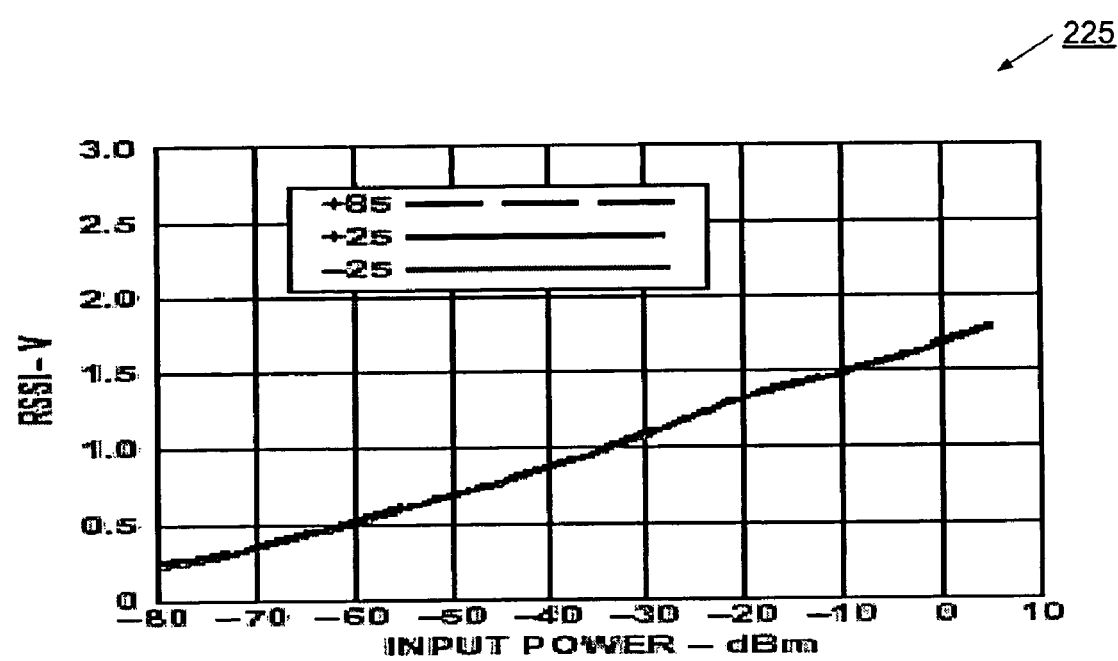
FIG. 6 is chart comparing RSSI to Input power.

Referring again to FIG. 2, in antenna system 50, the RF signals from the various antenna elements are filtered, amplified and may be down-converted to a convenient IF (or baseband) frequency. The IF signals are filtered and amplified, then passed-on to a stage that multiplies them by their relative signal strength. This scaling can be derived from the RSSI (signal strength measurement) being generated in a standard amplifier stages (for example the AD8309 amplifier). FIG. 6 shows a typical RSSI v. input power chart 225 for an amplifier circuit. In addition, a phase measurement may be continuously performed between the channels. Since a phase change is a much slower process than changes in information rate, the processing bandwidth can be much slower (25-100 times) than the information processing bandwidth. Once the phase relationship has been determined, the phase relationship is adjusted to put the received signals in a generally coherent arrangement.

In one example of aligning the phases of the IF signals, the strongest IF signal is selected as the reference phase. As discussed above, each of the signals is scaled by its relative signal strength. Any phase difference measured from the reference channel to the others is corrected on the other channels using a look up table and a quadrature modulator. A phase shift by phase P1, is performed by multiplying the IF channel by $e^{jP1}$ using a (sine, cosine) look up table and a Quadrature modulator. After the IF signals are shifted to a nearly coherent phase, they are summed and passed for further processing and demodulation.

A digital signal processor (DSP) may be used to perform some of the mathematical processes for the antenna system. It will be understood that the DSP may be implemented as a hardware component, or may be provided as a firmware or software process operating on a microprocessor, gate array, programmable logic device, or other processor. Once the received RF signals are mixed or otherwise converted to a lower frequency (IF or baseband), the resultant signals are processed and digitized into digital data. After digitizing, further processing may be done in the DSP. For example, the DSP may be used to calculate the RSSI value for each channel, perform the signal scaling process, detect phase differences, rotate the phase of one or more channels, and sum the coherent channels.

The DSP may also identify any channel that is 10 dB or more below the strongest channel, and ignore the weak channel or channels. Even if not ignored, after the multiplication by the square of its own strength, the contribution of a weak channel is greatly reduced. In a case where the antenna system uses a form of FM modulation, hard limiters may be used in IF processing. This simplifies the processing as multiplication is just by +/−1. This is particularly important in miniature radios using FSK, MSK or GFSK modulations, where power is limited.

Figure 7:
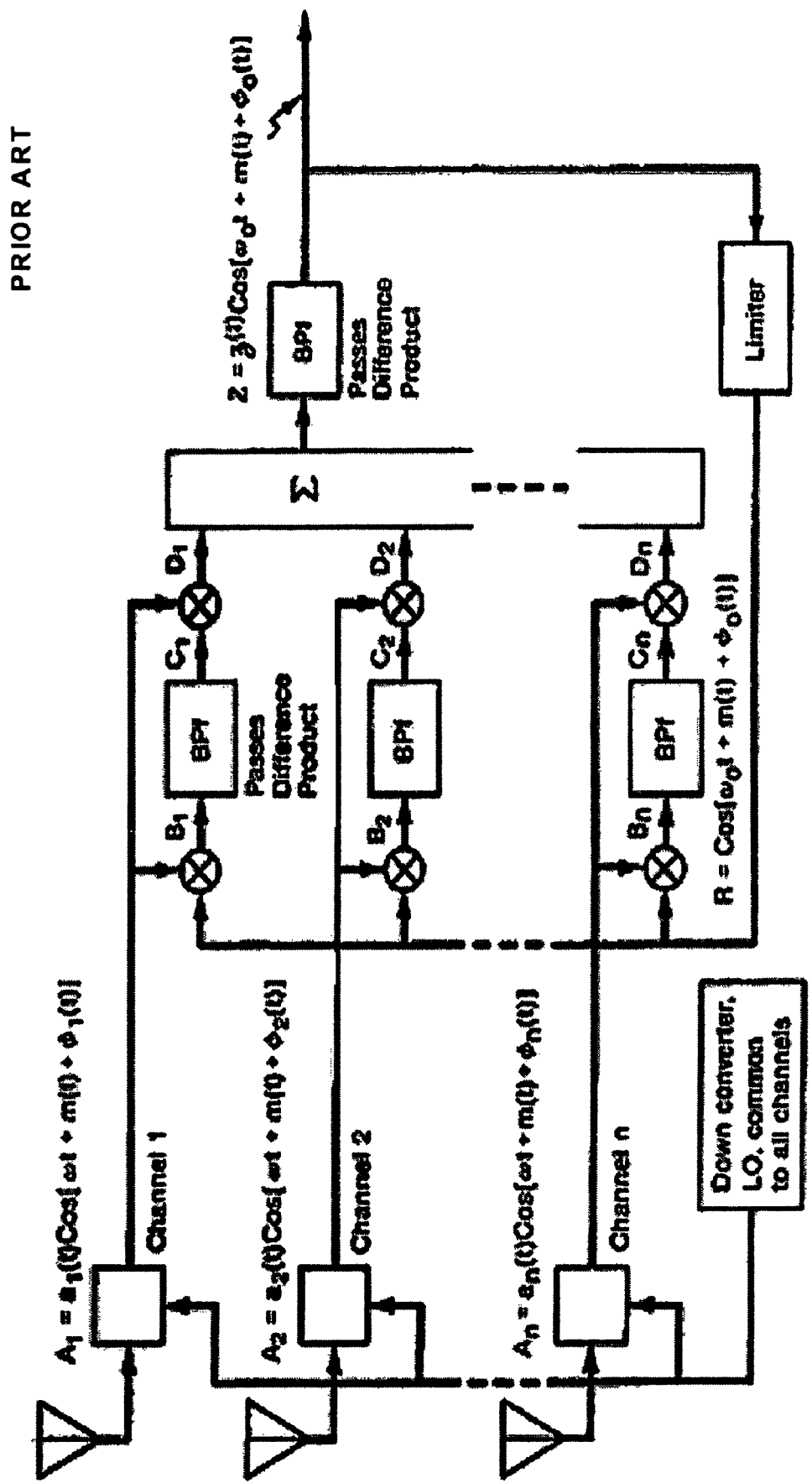
FIG. 7 is a block diagram of a prior art MRC combining process.

The disclosed diverse antenna system generates a combined signal that is similar in quality and SNR as compared to the combined signal generated using the known MRC process. In contrast to IF MRC (FIG. 7), all the operations after mixing may be done in the DSP and forwarded to the demodulator in quadrature format, ready for DSP demodulation. This eliminates much of the complexity and cost associated with implementing MRC.

Figure 4:
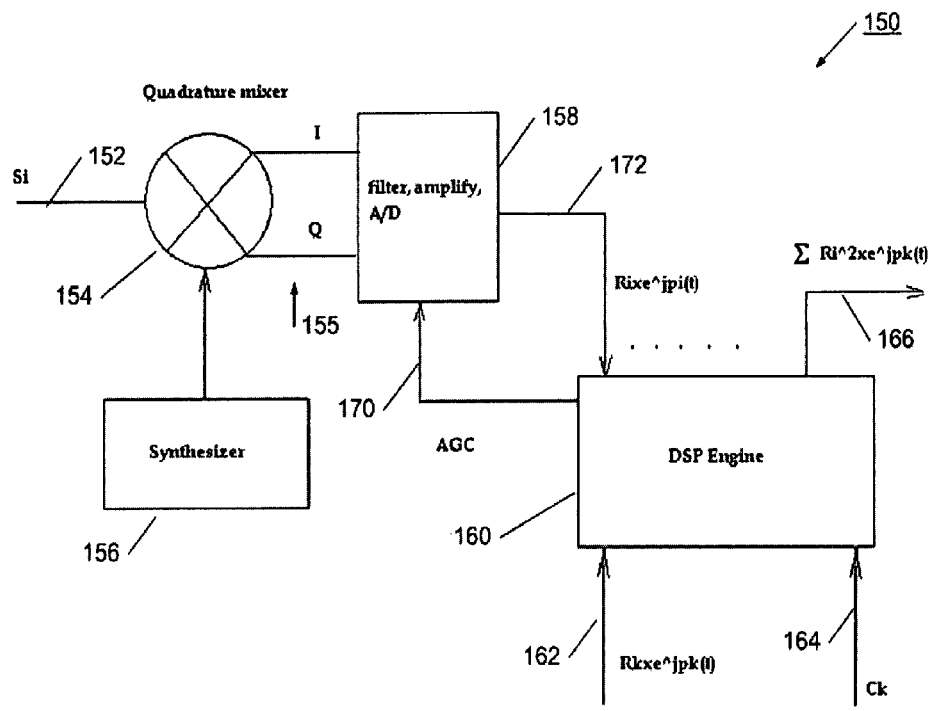
FIG. 4 is a block diagram of DSP process for a diverse antenna system in accordance with the present invention.

FIG. 4 shows an example of DSP processing on a single channel of receiver section 150. Receiver section 150 receives an intermediate frequency signal 152, which was generated responsive to a wireless signal being received at an antenna element (not shown). The overall receiver has a diverse antenna arrangement, having at least two antennas, with each antenna generating a respective wireless signal. To simplify FIG. 4, only one channel is shown in detail. The intermediate frequency signal 152 is mixed in mixer 154 with a signal received from a local oscillator 156. The mixer 154 generate a complex quadrature signal 155 having I and Q component. The complex signal 155 is filtered, amplified, and digitized in processing block 158. It will be understood that other processing steps may be used, and that the processing steps are well know and need not be addressed in detail. A digital data path 172 is used to send digital data from the processing block 158 to the DSP engine 160. To avoid saturation and maintain signal integrity, the DSP may incorporate an automatic gain process that provides an AGC signal 170 to adjust the analog to digital converter. The DSP will also receive digital data streams representative of the signals received at the other antenna element(s). FIG. 4 shows a second digital data stream 162 being received from a second channel. It will be understood that more than two antennas and channels of data may be used in particular applications. The DSP may then:

Calculate the power of channel 162;

Multiply the data in channel 162 by the square of the calculated power for channel 162; the channel 162 may be scaled by either RSSI (if processing is done in IF) in the IF amplifier or by calculating the signal strength Ri by estimating its I and Q level in the DSP engine, ($\sqrt{I^2+Q^2}$);

Calculate the power of channel 172;

Multiply the data in channel 172 by the square of the calculated power for channel 172; the channel 172 may be scaled by either RSSI (if processing is done in IF) in the IF amplifier or by calculating the signal strength Ri by estimating its I and Q level in the DSP engine, ($\sqrt{I^2+Q^2}$);

Compare the power level of channel 162 and 172 and set the stronger as the reference channel (optional);

Ignore either channel 162 or 172 if it is 10 db or more weaker than the other channel (optional);

Calculate the phase difference between channel 162 and 172; a phase measurement between any 2 channels can be easily performed by either directly calculating the difference or using an arc-tangent lookup table.

Rotate one or both channels according to the phase difference so that the channels are substantially coherent;

Sum the coherent channels into a combined channel 166.

The combined channel 166 may then be passed to other receiver processes for further processing and demodulation. The DSP engine 162 may be driven with an external clock signal 164.

Advantageously, the open loop solution described above provides performance results nearly identical to the much more complex and costly close loop MCR. It is expected that in implementing the diverse antenna system 50, hardware component savings may be in the order of 50% as compared to the MRC system. The diverse antenna system does not multiply the signal path by itself (as done in the MRC) and so not only avoids the multiplier but also the extra filtering. By using DSP, the performance is highly accurate and may use only a single FPGA DSP engine.

Figure 5:
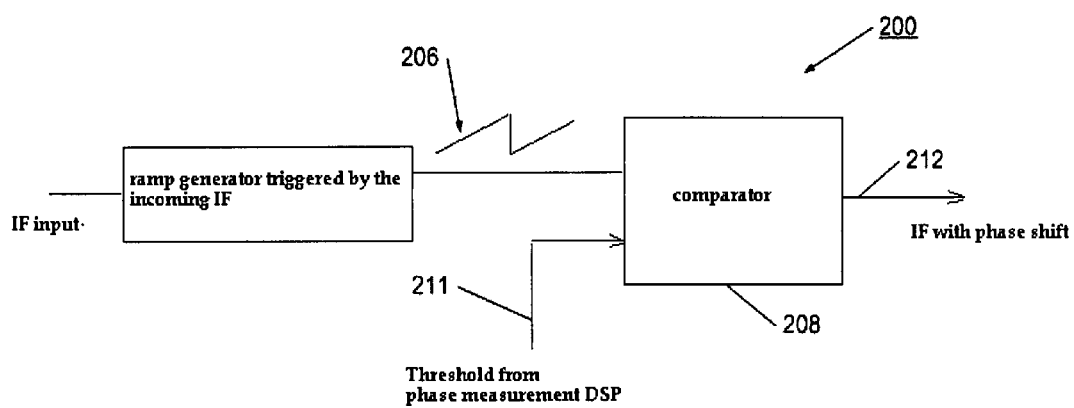
FIG. 5 is a block diagram of a IF phase shifter for a diverse antenna system in accordance with the present invention.

Phase shifting at the IF 212 (say 455KHz or 10.7MHz) can be done cost-effectively using delay time, which saves the Quadrature multiplier. In the case of FM systems 200, the time shift can be performed by passing the signal 206 thru a comparator 208 with changing threshold 211, as shown in FIG. 5. In baseband, the same function can be performed by simply calculating the arc tangent of the complex number I+jQ, phase1,2=atan(Q1/I1)−atan(Q2/I2).

A simple method has been demonstrated for simplified antenna combining in general systems and specifically for FM. Each channel is emphasized or de-emphasized by its own strength then combined after it has been phase rotated so that all signals add coherently. The antenna combiner system discussed in this document saves significant hardware components which translates into smaller size, lower power and less cost as compared to the traditional close loop MRC. The disclosed diverse antenna combining process reduces cost, improves accuracy and processing flexibility and drastically reduces production cost.

While particular example and alternative embodiments of the present intention have been disclosed, it will be apparent to one of ordinary skill in the art that many various modifications and extensions of the above described technology may be implemented using the teaching of this invention described herein. All such modifications and extensions are intended to be included within the true spirit and scope of the invention as discussed in the appended claims.

What is claimed is:

1. An antenna diversity system, comprising:
a plurality of antennas, each antenna providing a respective antenna signal;
a receiver portion arranged to process each respective antenna signal and generate a set of channel signals;
signal strength circuitry for determining a respective power level for each channel signal and for generating a scaling factor for each channel from each of the respective power levels;
scaling circuitry arranged to multiply each channel signal by its respective scaling factor to generate a respective scaled channel signal;
a phase estimator arranged to determine a reference phase according to the power levels and to measure a phase difference between channel signals and the reference phase;
a phase rotator operating as an open loop circuit and arranged to rotate the phase of at least one of the channel signals according to the measured phase difference; and
summing circuitry arranged to combine the rotated channel signal with at least one other channel signal.

2. The antenna diversity system according to claim 1, wherein the scaling circuitry is an open loop circuit and configured to receive an RSSI power factor from the receiver portion and to use the RSSI power factor in generating the scaling factor.

3. The antenna diversity system according to claim 1, wherein the scaling circuitry is configured to receive a complex baseband communication signal from the receiver portion and to use the complex communication signal in generating the scaling factor.

4. The antenna diversity system according to claim 1, further comprising a DSP processor, the DSP processor constructed to implement the phase estimator.

5. The antenna diversity system according to claim 1, further comprising a DSP processor, the DSP processor constructed to implement the phase rotator.

6. The antenna diversity system according to claim 1, further comprising a DSP processor, the DSP processor constructed to implement the summing circuitry.

7. A method for combining diverse antenna signals, comprising:
receiving a plurality of antenna signals;
processing the antenna signals into respective channel signals;
determining a power level for each respective channel signal;
generating a scaling factor for each channel signal using that channel signal's respective power level;
multiplying each channel signal according by its respective scaling factor;
determining a reference phase using the power levels;
measuring a phase difference between the channel signals;

adjusting, using an open loop circuit, the phase difference between the channel signals and the reference phase to make the channel signals substantially coherent; and summing the substantially coherent scaled channel signals.

8. The method according to claim 7, wherein the receiving step includes receiving only a first antenna signal and a second antenna signal.

9. The method according to claim 7, wherein the processing step comprises processing steps in the radio frequency (RF) band.

10. The method according to claim 7, wherein the processing step comprises processing steps in an intermediate frequency (IF) band.

11. The method according to claim 7, wherein the generating step comprises receiving an RSSI power factor from an amplifier circuit.

12. The method according to claim 7, wherein the generating step comprises receiving a complex signal on each of the channels, and calculating estimated power factors using the respective complex signal.

13. The method according to claim 7, further comprising the steps of:

comparing the power levels.

14. The method according to claim 13, wherein responsive to the comparing step the higher power channel is set as a reference channel for measuring the phase difference.

15. The method according to claim 13, wherein responsive to the comparing step the lower power channel signal is ignored.

16. The method according to claim 15, wherein the power level of the ignored channel signal is about 10 or more db lower than the power level of the other channel signal.

17. The method according to claim 7, wherein the adjusting step comprises rotating the phase of at least one of the channel signals.

18. The method according to claim 7, wherein the method obtains optimum signal to noise ratio performance as defined by a Maximum Ratio Combining (MRC) process operating on the same antenna signals.

19. A method for combining diverse antenna signals, comprising:

receiving a first antenna signal and a second antenna signal;

processing the first antenna signal and the second antenna signal into a first channel signal and a second channel signal, respectively;

determining a power factor for each of the channels signals;

setting the channel signal with the higher power factor to be a reference channel signal;

multiplying each channel signal by its respective power scaling factor;

measuring a phase difference between the reference channel and the other channel;

rotating, using an open loop circuit, the phase of the other channel using the measured phase difference to reduce the phase difference; and summing the multiplied first channel and the multiplied second channel into a combined signal.

20. The method according to claim 19, determining the power factor includes receiving an RSSI power factor from an amplifier.

21. The method according to claim 19, wherein determining the power factor includes receiving a complex signal on each channel, and using the complex signals in calculating each channel's respective power factor.

22. The method according to claim 19, further including using a DSP circuit to rotate the phase of the other channel.

23. The method according to claim 19, wherein the method and a Maximum-Ratio Combining (MRC) process provide similar combined signals.

\* \* \* \* \*